United States Patent [19]

Masuda et al.

[11] Patent Number: 4,540,170
[45] Date of Patent: Sep. 10, 1985

[54] PAPER FEED CONTROL DEVICE

[75] Inventors: Shunichi Masuda, Tokyo; Katsushi Furuichi; Naomi Takahata, both of Yokohama, all of Japan

[73] Assignee: Canon Kabushiki Kaisha, Tokyo, Japan

[21] Appl. No.: 651,659

[22] Filed: Sep. 18, 1984

Related U.S. Application Data

[63] Continuation of Ser. No. 369,755, Apr. 19, 1982, abandoned.

[30] Foreign Application Priority Data

Apr. 27, 1981 [JP] Japan ................................ 56-64936

[51] Int. Cl.³ ............................................. B65H 7/02
[52] U.S. Cl. .................................... 271/259; 271/265
[58] Field of Search ........................ 271/259, 261, 265

[56] References Cited

U.S. PATENT DOCUMENTS

| | | | |
|---|---|---|---|
| 3,322,261 | 5/1967 | Jensen | 271/261 X |
| 3,883,134 | 5/1975 | Shinaki | 271/261 X |
| 4,201,378 | 5/1980 | Hams | 271/261 |
| 4,400,085 | 8/1983 | Nezu | 271/261 X |

Primary Examiner—Richard A. Schacher
Attorney, Agent, or Firm—Fitzpatrick, Cella, Harper & Scinto

[57] ABSTRACT

The invention provides a paper feed control device having paper feed rollers for feeding a paper sheet such as an original to a predetermined position, a first sensor for detecting the paper sheet, a second sensor for detecting leading and trailing ends of the paper sheet, a microcomputer for controlling the rollers in response to the outputs signals from the sensors, and a compensating circuit for compensating the level of the output signal from the second sensor which is maintained in a non-detecting state until the paper sheet completely passes through the second sensor. Therefore, even if punched holes for filing are formed on the paper sheet, the punched hole may not be detected as the trailing end of the paper sheet, resulting in proper feeding.

9 Claims, 10 Drawing Figures

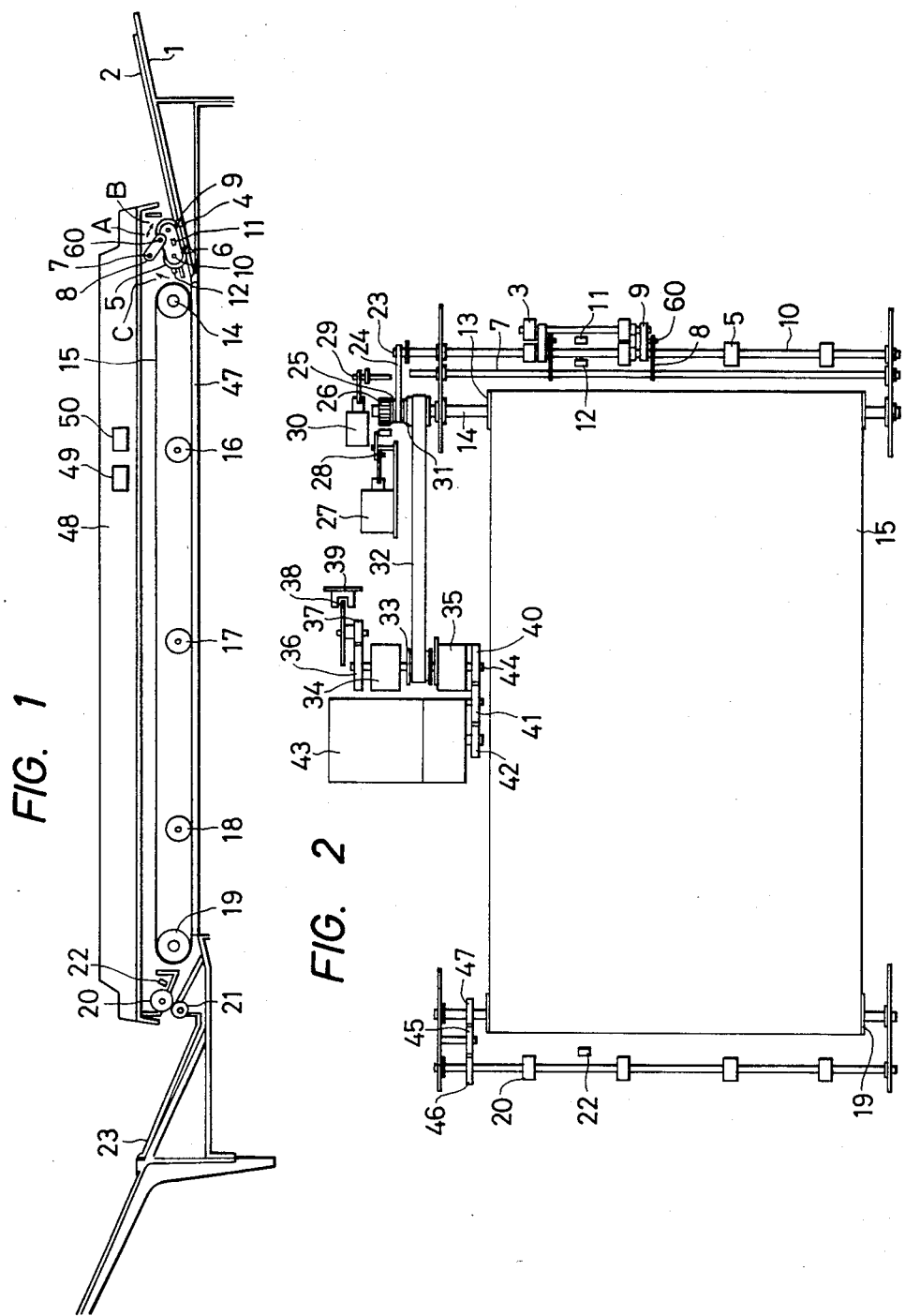

PAPER FEED CONTROL DEVICE

This application is a continuation of application Ser. No. 369,755 filed Apr. 19, 1982 now abandoned.

BACKGROUND OF THE INVENTION

1. Field of the Invention

The present invention relates to a paper feed control device for feeding a paper sheet such as an original to a predetermined position.

2. Description of the Prior Art

An automatic document feeder (ADF) is generally mounted in a copying machine to feed each paper sheet to an exposure position.

In the ADF of this type, conventionally, the leading or trailing end of the original is detected by a photosensor at the inlet port for the original and a timer of the like is operated for a predetermined time interval. When the time interval for feeding the original to the exposure position of the glass platen is elapsed, the feeder stops feeding the original. Meanwhile, the original may have punched holes for filing. The size of the holes may vary. If the photosensor detects one of the holes at the original inlet port and determines that the original has already passed, a jam detector may be erroneously operated. Further, the original is not properly positioned at the exposure position, resulting in poor appearance of the image.

SUMMARY OF THE INVENTION

It is, therefore, an object of the present invention to solve the above problems and it is an object of the present invention to provide a paper feed control device for compensating an erroneous operation with changes in a detection signal when a paper sheet is fed.

It is another object of the present invention to provide a paper feed control device for compensating an erroneous operation due to changes in the detection signal by maintaining the detecting state even if the non-detecting state is maintained after a photosensor outputs the detection signal and before the paper sheet is passed.

It is still another object of the present invention to provide a paper feed control device having two paper sheet detecting means wherein changes in a signal from one of the detecting means is compensated by a signal of other detecting means.

The other objects, features and advantages of the present invention will be apparent from the following detailed description when taken in conjunction with the accompanying drawings.

BRIEF DESCRIPTION OF THE DRAWINGS

FIG. 1 is a sectional view of an automatic document feeder;

FIG. 2 is a plan view of a drive unit of the feeder shown in FIG. 1;

DETAILED DESCRIPTION OF THE PREFERRED EMBODIMENTS

Figure 3:
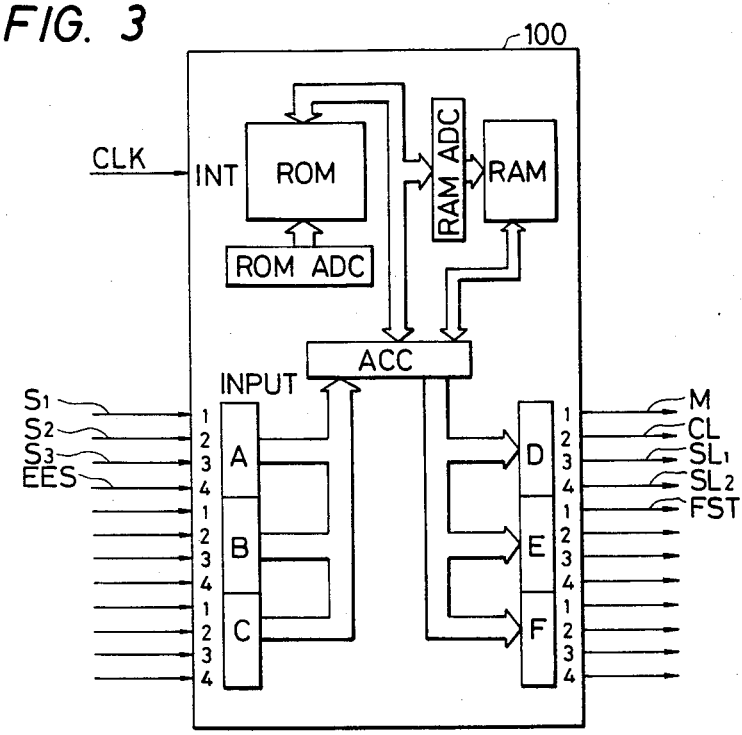
FIG. 3 is a block diagram of a control unit of the feeder shown in FIG. 1.

The preferred embodiments of the present invention will now be described with reference to the accompanying drawings. FIG. 1 is a sectional view of one embodiment of an automatic document feeder to which the present invention is applied. A paper feed tray 1 places each original 2 (paper sheet) thereon. The surface of the original 2 to be copied faces down on the paper feed tray 1. A pick up roller 3 is made of a rubber material having a large friction coefficient and is rotated about a feed roller shaft 10 in the direction indicated by arrows A and B. A feed roller 5 (of the same material as the pickup roller) is mounted on the feed roller shaft 10. Upon rotation of the feed roller shaft 10, the feed roller 5 is rotated and the rotational force is transmitted to the pickup roller 3 through gears. The feed roller 5 and the pickup roller 3 are rotated in the same direction and at the same peripheral speed. A paper feed roller 4 is driven when the original 2 is inserted between the paper feed roller 4 and the pickup roller 3 whose rotating shaft is mounted on the paper feed tray 1 and when the pickup roller 3 urges the original 2 against the paper feed tray 1.

A paper feed roller 6 is urged against the feed roller 5. The paper feed roller 6 is driven when the original 2 passes through the feed roller 5 and the paper feed roller 6. An pickup arm 8 pivots about a pickup arm shaft 7 and has a U-shaped groove at one end. The pickup arm 8 is fitted on a shaft 60 mounted on a paper feed arm 9 which pivots about the feed roller shaft 10. When the pickup arm shaft 7 pivots in the counterclockwise direction, the pickup arm 8 pivots in the counterclockwise direction (direction indicated by arrow A). Further, the paper feed arm 9 pivots in the counterclockwise direction about the feed roller shaft 10. The pickup roller 3 is separated from the paper feed roller 4.

When the pickup arm shaft 7 pivots in the clockwise direction, the pickup arm 8 is rotated in the clockwise direction. Further, the paper feed arm 9 is rotated in the clockwise direction about the feed roller shaft 10. The pickup roller 3 which is apart from the paper feed roller 4 comes in tight contact with the paper feed roller 4. If the original 2 is in the predetermined position, the original is clamped between the pickup roller 3 and the paper feed roller 4. A reflection type sensor 11 detects the presence or absence of the original 2. A reflection type sensor 12 detects the leading end of the original. The sensor 11 is called an original sensor and the sensor 12 is called a leading end sensor.

A belt 15 is an endless belt to cover the entire surface of an original table 47 and coated with the rubber material having a sufficient friction coefficient in order to convey the original thereon. Even if the surface of the belt 15 is contaminated, contamination it may be cleaned with alcohol. The belt 15 is wound around a drive roller 13 and a turn roller 19. Tension acts on the shaft of the turn roller 19 in the left direction in FIG. 1 so as to prevent slipping between the drive roller 13 and the belt 15. Press rollers 16, 17 and 18 are disposed inside the belt 15. The pitches between the feed roller 5 and the press roller 16, between the press rollers 16 and 17, between the press rollers 17 and 18, and between the press roller 18 and an exhaust roller 20 are slightly smaller than the length of the original 2. Each roller slightly urges the belt 15 toward an original glass platen 47. Therefore, when the original passes between the original glass platen 47 and the belt 15, conveying efficiency is increased.

An exhaust original sensor 22 is of a reflection type sensor and causes the jam lamp to turn on when an original does not pass for a predetermined time interval after the original is fed.

The exhaust roller 20 is urged by an exhaust roller 21. The exhaust roller 20 delivers the original which is copied on the original glass platen 47.

The exhaust roller 21 is driven by movement of the original. The original exhausted by the exhaust roller 20 is sequentially stacked on an exhaust tray 23. The exhaust roller 21 is a knurled roller to stack the originals on the exhaust tray 23 effectively. A drive unit of the ADF will be described with reference to FIG. 2.

A drive gear 42 is mounted on the rotating shaft of a motor 43 and the driving force is transmitted to a gear 40 through a idler gear 41. The rotational force of the gear 40 is transmitted to a clutch shaft 44 when an electromagnetic clutch 35 is turned on. Thus, the clutch shaft 44 is rotated. An electromagnetic brake 34 serves to interrupt the rotation of the clutch shaft 44. When the electromagnetic brake 34 is energized, the rotation of the clutch shaft 44 is interrupted. When the clutch shaft 44 with a gear 36 mounted thereon is rotated, the gear 36 is rotated. The rotational force is transmitted to a clock disc gear 37 which then accelerates the rotational force and drives a clock disc 38. A number of grooves are formed on the circumferential part of the clock disc 38. A photointerrupter 39 reads the number of grooves to count the clocks. The rotation of the clock shaft 44 is transmitted to a drive pulley 33 mounted on the clutch shaft 44 and a driven pulley 31 mounted on a drive roller shaft 14. The rotation of the clutch shaft 44 is transmitted to a drive roller shaft 14 through a belt 32. A large pulley 25 is mounted on the drive roller shaft 14 through a spring clutch. A plunger 27 controls a spring clutch control ring 26 through a clutch pawl 28 to transmit or interrupt transmitting the driving force. A small pulley 23 receives the rotational force from the large pulley 25 through a belt 24 and is mounted on the feed roller shaft 10 through a one-way clutch.

The ratio of the diameter of the large pulley 25 to that of the small pulley 23 is determined so that the peripheral speed of the belt 15 is slightly faster than that of the feed roller 5. When the original 2 is fed along the belt 15, the small pulley 23 is one-way coupled to the feed roller shaft 10 so as to rotate the feed roller 5 at the same feeding speed of the original. The feed roller 5 and the pickup roller 3 are coupled through gears and rotated in the same direction and at the same speed. A plunger 30 causes a lever 29 to rotate the pickup arm shaft 7. Therefore, the pickup roller 3 is vertically moved.

The mode of operation of the ADF with the above arrangement will be described.

When the original 2 is placed on the paper feed tray 1 and then inserted between the pickup roller 3 and the paper feed roller 4, the original sensor 11 detects the original. When a predetermined time interval $T_1$ elapses, the plunger 30 is energized and the pickup roller 3 is moved downward. Therefore, the document is clamped between the pickup roller 3 and the feed roller 4. If the original is not present, the pickup roller 3 is lifted upward. When the plunger 30 is energized, the motor 43 is simultaneously driven. Further, the clutch 35 is energized so that the drive roller 13 is rotated. In this condition, the plunger 27 is not energized and the large pulley 25 is stopped by the spring clutch. The original is not thus conveyed. When the motor is driven and a predetermined time period $T_2$ elapses, the plunger 27 is energized and the clutch pawl 28 is separated from the control ring 26. The rotation of the drive roller shaft 14 is transmitted to the feed roller shaft 10. The feed roller 5 and the pickup roller 3 are rotated. Thus, the original 2 is conveyed.

When the leading end of the original 2 passes between the feed roller 5 and the paper feed roller 6, the leading end sensor 12 detects the leading end of the original 2. The photointerrupter 39 starts counting the clocks (grooves) from the clock disc 38. The original 2 is then conveyed between the belt 15 and the original glass platen 47. When the leading end of the original 2 comes under the press roller 16, the conveying force of the belt 15 is increased, and the original 2 is fed at the same speed as the peripheral speed of the belt 15. Therefore, the peripheral speed of the original 2 is faster than the speed of the feed roller 5 so that the speed of the feed roller 5 is increased to the speed of the original 2. When the trailing end of the original 2 is detected by the original sensor 11, the plunger 30 is deenergized and the pickup roller 3 is moved upward. Further, when the trailing end of the original 2 is detected by the leading end sensor 12, the plunger 27 is deenergized. Thus, the feed roller 5 and the pickup roller 3 are stopped in order to prevent reception of the next original.

When the leading end sensor 12 detects the leading end of the original 2 and the photointerrupter 39 counts the predetermined number of clocks, the motor 43 is deenergized. Simultaneously, the clutch 35 is deenergized. On the other hand, the electromagnetic brake 34 is energized to immediately stop the rotation of the clutch shaft 44. The drive roller shaft 14 and the belt 15 are stopped instantaneously. The original 2 is thus positioned in the predetermined position of the original glass platen 47. A copy start signal is then supplied to the copying machine main body and the copying operation is started. In other words, the original is exposed to light on the copying machine main body. The electromagnetic brake 34 is deenergized after a predetermined time interval.

In response to a copy end signal, the motor 43 starts rotating. The clutch 35 is energized and the belt 15 delivers the original 2 which is then clamped between the exhaust roller 20 and the exhaust roller 21. Thus, the original 2 is delivered to the exhaust tray 23.

When the original sensor 11 detects the next original, the original exhaust sensor 22 detects the leading end of the original 2 and then the plunger 27 is energized. The original 2 is fed in the same manner as described above.

FIG. 3 is a block diagram of a control unit of the ADF. The control unit comprises a one-chip microcomputer which has known ROM and RAM. The ROM, the RAM, a ROM address counter ROMADC, a RAM address counter RAMADC, an accumulator ACC input ports A, B and C, and output ports D, E and F are arranged as shown in FIG. 3. A clock signal from the clock disc 38 and the photointerrupter 39 is supplied to an interrupt terminal INT and used as a reference signal for the ADF sequences and jam detection. An output signal $S_1$ from the original sensor 11 is supplied to a terminal 1 (to be referred to as PA1 hereinafter) of the input port A. An output signal $S_2$ from the leading end sensor 12 is supplied to a terminal 2 (to be referred to as PA2 hereinafter) of the input port A. An output signal $S_3$ from the original exhaust sensor 22 is supplied to a terminal 3 (to be referred to as PA3 hereinafter) of the input port A. An exposure end signal from the copying machine main body is supplied to a terminal 4 (to be referred to as PA4 hereinafter) of the input port A.

A drive signal M from the motor 43 is supplied to a terminal 1 (to be referred to as PD1 hereinafter) of the output port D. A drive signal CL from the electromagnetic clutch 35 is supplied to a terminal 2 (to be referred to as PD2 hereinafter) of the output port D. A drive signal $SL_1$ from the plunger 30 is supplied to a terminal 3 (to be referred to as PD3 hereinafter) of the output port D. A drive signal $SL_2$ from the plunger 27 is supplied to a terminal 4 (to be referred to as PD4 hereinafter) of the output port D. A start signal FST from the copying machine main body is supplied to a terminal 1 (to be referred to as PE1 hereinafter) of the output port E.

Figure 4:
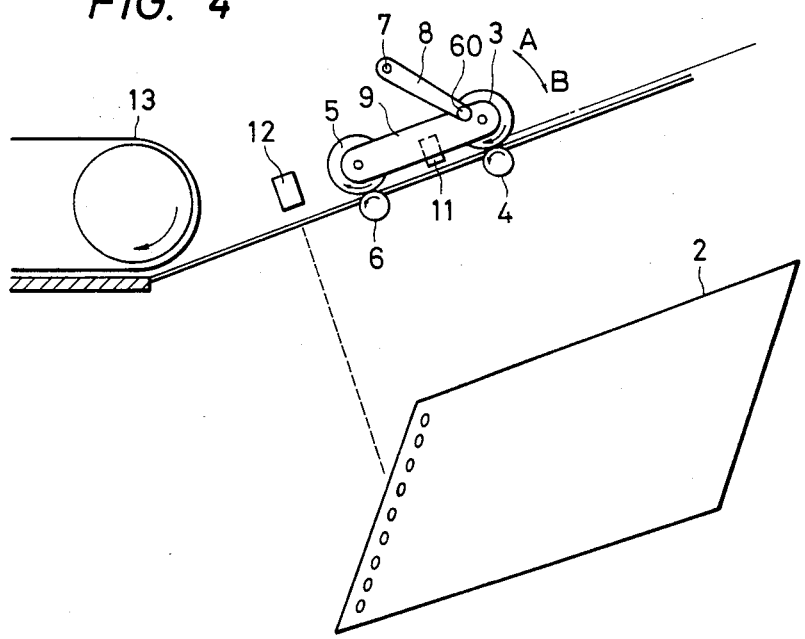
FIG. 4 is an enlarged view of a document inlet port.

FIG. 4 is an enlarged view of an original inlet port of the ADF shown in FIG. 1. When the original 2 having a number of aligned punched holes is inserted, the leading end sensor 12 detects the leading end of the original and then the holes. Therefore, the output signal $S_2$ with a waveform shown in FIG. 6 which is produced by leading end sensor 12 is supplied to the port PA2 of a microcomputer 100. Conventionally, the microcomputer determines that one original has passed since the leading end sensor detects one of the holes, resulting in erroneous operations. For example, jam detection is performed and the original cannot be conveyed to the predetermined position, resulting in misalignment of the image. According to the present invention, therefore, the output signal from the leading end sensor 12 which detects a hole or the like is compensated.

Figure 5:
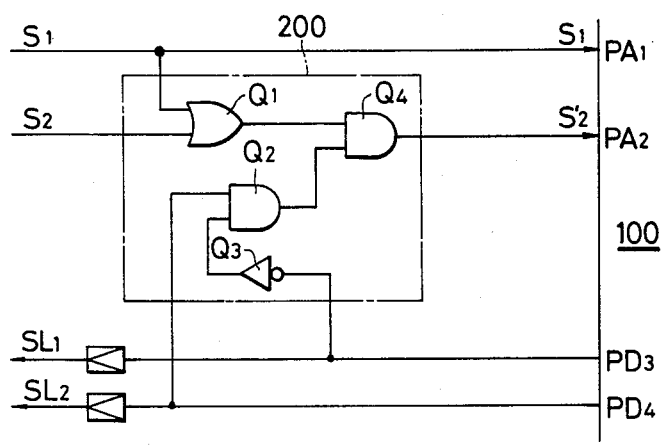
FIG. 5 is a circuit diagram of a compensating circuit according to one embodiment of the present invention.

FIG. 5 shows a compensating circuit according to one embodiment of the present invention. The output signal $S_1$ from the original sensor 11 is supplied to the input terminal PA1 of the microcomputer 100 and to one of the terminals of an OR gate $Q_1$. The output signal $S_2$ from the leading end sensor 12 is supplied to the other terminal of the OR gate $Q_1$. The output signal $SL_1$ from the output terminal PD3 of the microcomputer 100 is supplied to one of the terminals of an AND gate $Q_2$ through an inverter $Q_3$. The output signal $SL_2$ from the output terminal PD4 is supplied to the other terminal of the AND gate $Q_2$. Output signals from the OR gate $Q_1$ and the AND gate $Q_2$ are supplied to an AND gate $Q_4$. An output signal from the AND gate $Q_4$ is supplied to the input terminal PA2 of the microcomputer 100.

Figure 6:
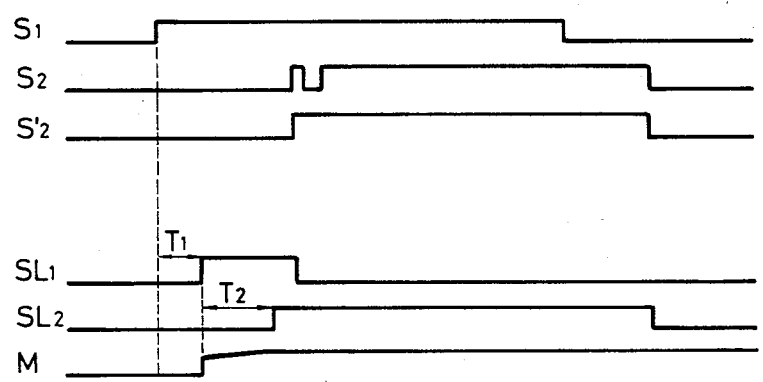
FIG. 6 shows timing charts of signals in the compensating circuit shown in FIG. 5.

The mode of operation of the compensating circuit will be described with reference to the timing charts shown in FIG. 6. When the original is set in the feed tray 1, the original sensor 11 detects the original 2. When the predetermined time interval $T_1$ elapses, the output signal $SL_1$ is set to high level and the plunger 30 is turned on. The pickup roller 3 is then moved downward. Simultaneously, the motor 43 is driven. When the predetermined time interval $T_2$ elapses, the signal $SL_2$ is set to high level and the plunger 27 is turned on. Thus, the original is conveyed. When the leading end sensor 12 detects the leading end of the original 2, the output signal $S_2$ therefrom is set to high level. Simultaneously, the output signal $SL_1$ is set to low level. This signal is inverted by the inverter $Q_3$ and supplied to the AND gate $Q_2$. Therefore, the output from the AND gate $Q_2$ is set to high level. Meanwhile, since the output from the OR gate $Q_1$ is also set to high level, the output $S'_2$ from the AND gate $Q_4$ is set to high level. Even if the leading end sensor 12 detects a punched hole and the output signal therefrom is set to low level, the original sensor 11 generates the signal of level "1". Therefore, the output from the OR gate $Q_1$ stays at high level. The output $S'_2$ from the AND gate $Q_4$ stays at high level even if the leading end sensor detects the leading end of the original.

Figure 7:
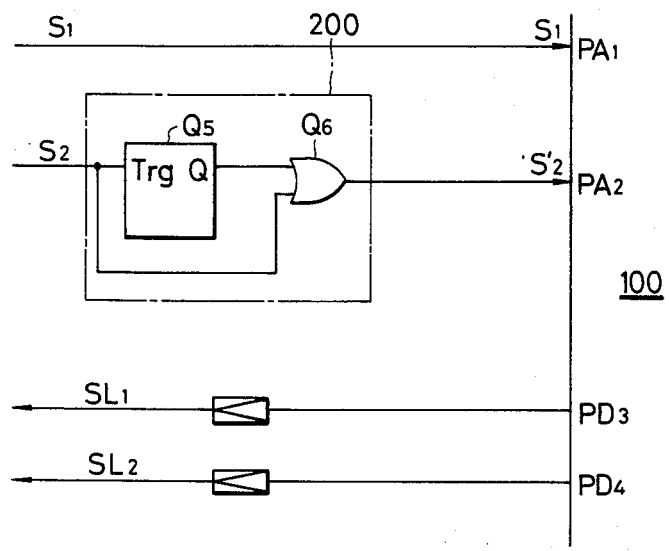
FIG. 7 is a circuit diagram of a compensating circuit according another embodiment of the present invention.

A compensating circuit according to another embodiment of the present invention is shown in FIG. 7. The compensating circuit 200 comprises a one-shot circuit $Q_5$ and an OR gate $Q_6$. The output signal $S_2$ from the leading end sensor 12 is supplied to the one-shot circuit $Q_5$ and one of the terminals of the OR gate $Q_6$. An output from the one-shot circuit $Q_5$ is supplied to the other terminal of the OR gate $Q_6$. The output signal $S'_2$ from the OR gate $Q_6$ is supplied to the input terminal PA2 of the microcomputer 100.

Figure 8:
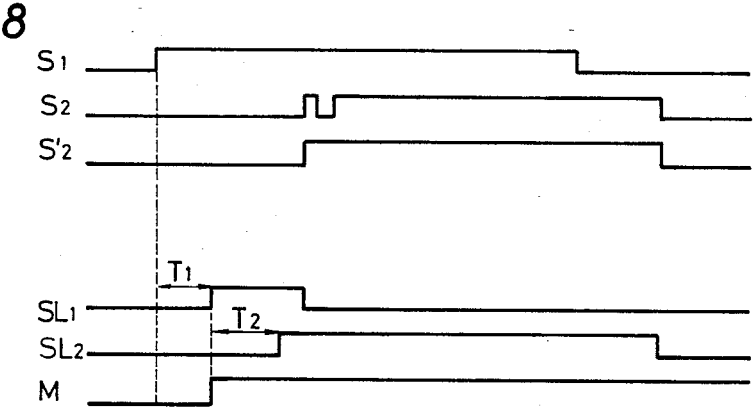
FIG. 8 shows timing charts of signals in the compensating circuit shown in FIG. 7.

The mode of operation will be described with reference to the timing charts shown in FIG. 8. When the leading end sensor 12 detects the leading end of the original and the output signal $S_2$ rises, the one-shot circuit $Q_5$ is triggered. The output signal from the one-shot circuit $Q_5$ is set to high level for a predetermined time interval. This time interval is sufficiently longer than a duration for which the leading end sensor 12 detects the leading end of the original and then the trailing end of the punched hole. The time interval described above is shorter than a duration for which the leading end sensor 12 detects the trailing end of the original. Therefore, even if the leading end sensor 12 detects the punched hole, that is, even if the output signal $S_2$ therefrom is set to low level, the signal of level "1" is generated from the one-shot circuit $Q_5$. Therefore, the output signal $S'_2$ from the OR gate $Q_6$ stays at high level.

A CR timer which comprises resistors and capacitors may be used in place of the one-shot circuit.

Figure 9:
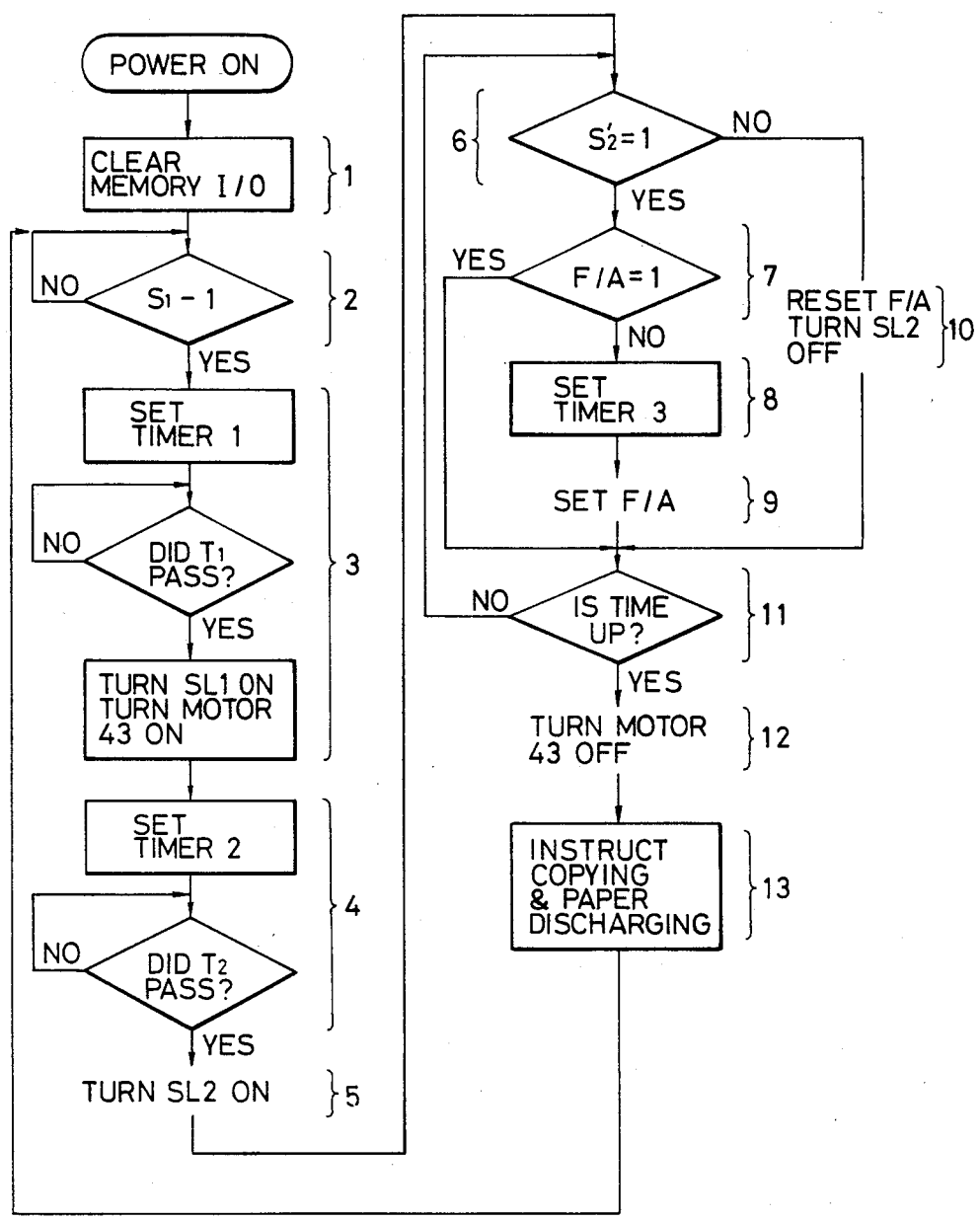
FIG. 9 is a flow chart for explaining the mode of operation of the paper feed control device.

The mode of operation of the ADF having a compensating circuit will be described with reference to the flow chart shown in FIG. 9. When the power switch is turned on, the data memory RAM and the I/O ports are cleared in step 1. It is checked in step 2 whether or not the original is set in the feed tray 1. If the original is set in the feed tray 1, the original sensor 11 detects the original. When the output signal from the original sensor 11 is set to high level, the flow advances to step 3 in which a first timer is set in accordance with data stored in a predetermined area of the RAM. When the predetermined time interval $T_1$ elapses, the first timer is turned off. The signal M from the output terminal PD1 is supplied to the motor 43. Simultaneously, the signal $SL_1$ from the output terminal PD3 is supplied to the plunger 30. Thus, the motor 43 and the plunger 30 are driven. In step 4, a second timer is set in accordance with data stored in a predetermined area of the RAM. When the predetermined time interval $T_2$ elapses, the output signal $SL_2$ of level "1" from the output terminal PD4 is supplied to the plunger 27 which is then driven. In step 6, the leading end sensor 12 detects the leading end of the original. When the output signal $S'_2$ from the compensating circuit 200 is set to high level, a F/A flag set in the RAM is checked in step 7. The flag F/A is used to inhibit the setting operation of a third timer for conveying the original to the exposure position on the original glass platen. At first, the flag F/A is not set. A third timer is set in step 8 and the flag F/A is set in step 9. It is checked in step 11 whether or not the time interval set by the third time has elapsed. While the original is conveyed, the time interval has not elapsed. The flow then advances to step 6. While the output signal S'2 from the compensating circuit 200 stays at high level, steps 7, 11 and 6 are repeated. When the leading end sensor 12 detects the trailing end of the original and the signal S'2 falls, the flow advances to step 10. The flag F/A is reset and the output signal $SL_2$ from the microcomputer 100 is set to low level. If the time interval set by the third timer is up in step 11, the signal M from the output terminal PD1 is set to low level to stop rotating the motor 43 in step 12. In step 13, the start signal FST from the output terminal PE1 of the microcomputer 100 is supplied to the copying machine main body. Exposure is thus initiated. When exposure is completed, the exposure end signal EES is supplied to the input terminal PA4 of the microcomputer 100. Therefore, the original is delivered from the exposure position to the exhaust tray 23.

The original may be conveyed to the exposure position by depressing a copy button on the copying machine main body.

Further, in the above embodiment, the reflection type sensor is used to detect the original. However, a transmission type sensor, a magnetic sensor, a microswitch or the like may be used to obtain the same effect.

Figure 10:
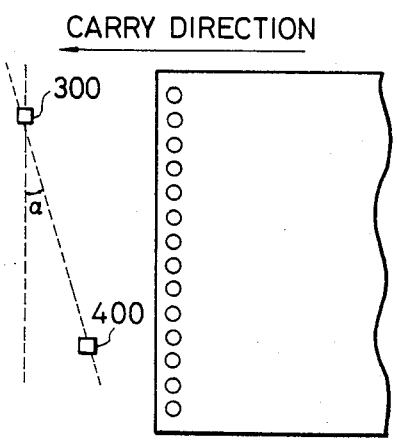
FIG. 10 shows a diagram used for the explanation of an embodiment where the present invention is applied to a rampdetector.

Further, the present invention may be applied to a ramp detector, as shown in FIG. 10. Sensors 300 and 400 for ramp detection are disposed to form an angle of $\alpha$ with respect to a line (connecting the sensors 300 and 400) perpendicular to the convey direction of the original. The angle $\alpha$ is determined by the allowable arrival error of the original to the exposure position.

Outputs from the sensors 300 and 400 are supplied as signals $S'_1$ and $S'_2$ to the compensating circuit shown in FIG. 5. Even if the sensor 400 detects the punched hole, outputs a detection signal and is maintained in the non-detecting state, this may be compensated by an output signal from the other sensor. Thus, ramp detection is performed properly without failure.

Further, the present invention may be applied to an ADF of the type in which upon detection of the original the control signal for example a copy start signal, is output to the main body side.

The present invention may also be applied to an ADF of the type in which the original is detected in the exposure position and the movement of the original is interrupted. Therefore, misalignment of the original position is prevented completely.

In the above embodiments, the operation for controlling the feeding operation of the original is described. However, the present invention is not limited to this particular control operation. The present invention may also be applied to an operation for controlling the feeding operation of recording media on the side of the copying machine main body.

In summary, even if the sensor is maintained in the non-detecting state after the leading end of the paper sheet such as the original is detected and a punched hole is then detected, the non-detecting state is converted to the detecting state. Thus, the erroneous operation due to the punched hole or the like is eliminated, so that the paper sheet may be conveyed properly and accurately.

What we claim is:
1. A feed control apparatus comprising:
conveying means for conveying a sheet to a predetermined position;
detecting means for sensing a trailing edge of the sheet conveyed by said conveying means;
control means for controlling said conveying means in accordance with a trailing edge sensing output signal from said detecting means; and
compensating means for compensating a pseudo-trailing edge detection signal from said detecting means such that when said detecting means produces said pseudo-trailing edge detection signal before the sheet passes through said detecting means, said pseudo-trailing edge detection signal is inhibited from being supplied to said control means.

2. An apparatus according to claim 1, wherein said compensating means compensates the level of the output signal from said detecting means when said detecting means detects the sheet and is maintained in a non-detecting state before the sheet completely passes therethrough.

3. An apparatus according to claim 1 or 2, wherein said compensating means has further detecting means for detecting the sheet disposed upstream of said detecting means in the conveying direction of the sheet, and an output from said further detecting means compensates the level of the output signal from the first mentioned detecting means.

4. An apparatus according to claim 3, wherein said further detecting means detects the presence or absence of the sheet to be conveyed.

5. An apparatus according to claim 2, wherein said compensating means has timer means for counting a predetermined time interval during which said compensating means compensates said first mentioned detecting means for variation of the level of the output signal therefrom.

6. An apparatus according to claim 5, wherein said detecting means is adapted to sense a leading edge of the sheet, and said timer means is set when the leading edge of the sheet is sensed by said detecting means.

7. An apparatus according to claim 1, wherein said conveying means has a first conveying portion located upstream from said detecting means and a second conveying portion located downstream from said detecting means, and said control means controls the operation of said first conveying portion in response to the trailing edge sensing output signal from said detecting means.

8. An apparatus according to claim 7 wherein said control means stops the operation of said first conveying portion in response to said trailing edge sensing output signal.

9. A sheet feeding apparatus comprising:
sheet feeding means for feeding a sheet along a feed path;
detector means for detecting the passage of a trailing edge of said sheet past a detection position in said feed path;
feed control means for controlling said sheet feeding means, said feed control means being arranged to provide a response to a trailing edge detection output of said detector means; and
compensation means for inhibiting said response of said feed control means to an erroneous trailing edge detection output produced by said detector means prior to the actual passage of the trailing edge past said detection position.

* * * * *